(12) United States Patent
Papenfuss et al.

(10) Patent No.: US 7,763,827 B2
(45) Date of Patent: Jul. 27, 2010

(54) METHOD AND APPARATUS FOR LASER WELDING INCORPORATING GALVANOMETER DELIVERY

(75) Inventors: Jason T. Papenfuss, Minneapolis, MN (US); David J. Buendorf, Maple Grove, MN (US)

(73) Assignee: Medtronic, Inc., Minneapolis, MN (US)

( * ) Notice: Subject to any disclaimer, the term of this patent is extended or adjusted under 35 U.S.C. 154(b) by 731 days.

(21) Appl. No.: 11/027,352

(22) Filed: Dec. 30, 2004

(65) Prior Publication Data

US 2006/0144827 A1 Jul. 6, 2006

(51) Int. Cl.
*B23K 26/00* (2006.01)

(52) U.S. Cl. .............. 219/121.64; 219/121.63; 219/121.85

(58) Field of Classification Search ............ 219/121.64, 219/121.63, 121.78, 121.79, 121.85
See application file for complete search history.

(56) References Cited

U.S. PATENT DOCUMENTS

| | | | |
|---|---|---|---|
| 4,144,440 A * | 3/1979 | Schalch et al. ............. 219/61.5 |
| 4,838,631 A | 6/1989 | Chande et al. |
| 5,144,949 A | 9/1992 | Olson |
| 5,158,078 A | 10/1992 | Bennett |
| 5,214,531 A * | 5/1993 | Torii et al. ................... 359/223 |
| 5,312,453 A | 5/1994 | Shelton et al. |
| 5,342,409 A | 8/1994 | Mullett |
| 6,177,648 B1 | 1/2001 | Lawson et al. |
| 6,415,191 B1 * | 7/2002 | Pryor ........................ 700/95 |
| 6,452,131 B2 * | 9/2002 | Britnell ................... 219/121.6 |
| 6,459,566 B1 | 10/2002 | Casby et al. |
| 6,501,043 B1 | 12/2002 | Ruben et al. |
| 6,613,474 B2 | 9/2003 | Frustaci et al. |
| 7,187,974 B2 * | 3/2007 | Haeg et al. .................... 607/36 |
| 2002/0088778 A1 * | 7/2002 | Chang ................... 219/121.63 |
| 2005/0205539 A1 | 9/2005 | Borgoltz et al. |

FOREIGN PATENT DOCUMENTS

| | | |
|---|---|---|
| JP | 60154891 | 8/1985 |
| WO | 03011514 | 2/2003 |
| WO | 2004009178 | 1/2004 |

* cited by examiner

*Primary Examiner*—M. Alexandra Elve

(57) ABSTRACT

Methods and systems for laser welding using a galvanometer to deliver laser energy in a multiple point sequence for high-speed and low-temperature welding of batteries, capacitors, medical devices, and related medical device components or the like.

19 Claims, 19 Drawing Sheets

METHOD AND APPARATUS FOR LASER WELDING INCORPORATING GALVANOMETER DELIVERY

FIELD SECTION

The invention relates to a method of performing laser welding and to a method of low temperature laser welding; in particular the invention pertains to methods and apparatus for welding implantable medical devices and associated components.

BACKGROUND SECTION

Laser welding has gained widespread acceptance in the metalworking industry, producing welds for items ranging from cigarette lighters and watch springs, to medical devices and related components, such as pacemakers, implantable defibrillators, batteries and hybrid circuit packages. Hermetic seals may be provided by laser welding processes to achieve the hermeticity required of implantable medical devices (IMDs) enclosures and associated internal components for IMDs such as batteries and capacitors.

Welding requires heating materials to a molten state so that they become fused together. A laser may be employed to generate light energy that can be concentrated and absorbed at a location in materials, producing the heat energy necessary to perform the welding operation. By using light energy in the visible or infrared portions of the electromagnetic spectrum, energy can be directed from its source to the material to be welded using optics which can focus and direct the energy with the required amount of precision. After the applied light energy is removed, the molten material solidifies and then begins to slowly cool to the temperature of the surrounding material.

At high temperatures, chemical reactions with atmospheric gases (i.e., oxidation) can pose problems, particularly when the oxides or other elements formed have disassociation temperatures far above the melting point of the metal. The result may be brittle, porous welds. A "cover gas," such as argon or helium (or other inert gas) may be used to cover the welding area, displacing atmospheric gases to minimize the effects of these types of chemical reactions.

The type of weld may have an influence on the laser welding parameters. There are two general weld types—seam welds and spot welds. Seam welding forms a continuous weld, while spot welding consists of discrete weld locations.

Laser welding systems typically consist of a laser source, a beam delivery system, and a workstation. Carbon Dioxide (CO2) and Nd:YAG (Neodymium-doped Yttrium Aluminum Garnet) are two laser sources or laser media used for laser welding applications. Both YAG and CO2 lasers may be used for seam welding and spot welding of both butt joints and lap (overlap) joints. Solid state lasers (which includes Nd:YAG, Nd:Glass and similar lasers), are often employed in low- to medium-power applications, such as those needed to spot weld or beam lead weld integrated circuits to thin film interconnecting circuits on a substrate, and similar applications.

For precise or delicate welding operations, solid state welding systems may offer the advantage of coaxial viewing optics that provide magnification so that the exact spot of the laser beam focus can be easily seen. This may enable more precise alignment and focusing of the laser beam, as well as workpiece viewing. Since the wavelength of the Nd:YAG laser is close to the visible spectrum, optical lenses may be used to transmit both the laser light and the image of the workpiece.

In certain welding applications requiring relatively low heat input (due to proximity to thermally-sensitive components, for example), the pulsed laser mode of operation may be suitable. When laser energy is absorbed by the material being welded, heat is conducted into the material, creating a weld pool in a very localized area. Depending on the type of material, some heat may be conducted through the part being welded and away from the weld zone, potentially toward thermally-sensitive material. When using a laser welding system in the pulsed mode, the peak power of the pulsed laser may be much higher than would be delivered in a continuous wave ("CW") mode, while delivering a lower average power (and hence, less heat) to the component being welded. The higher peak energy may be necessary to create the weld pool, while the lower average power may result in less heat transferred to thermally-sensitive material.

In electronic packaging applications, laser weld sealing can expose internal components, such as heat-sensitive seals, semiconductors, and plastic components, to high temperatures and related thermal effects and stresses. Pulsed Nd:YAG laser welding methods have been used to hermetically seal enclosures in electronic packaging applications. Pulsed laser sources, including Nd:YAG lasers, have been found to be suitable for the welding of electronic packages because the pulsed energy can deliver the necessary power to form a weld on a workpiece, while maintaining relatively low heat input. Pulsed laser welding employs a relatively high peak pulse energy to provide adequate weld penetration, while the intermittent nature of the pulsed energy results in a low average power delivered, which tends to reduce the total heat input.

Certain applications, such as hermetic seam welds, may require a certain amount of overlap (for example, 75-80%) of the laser pulses (successive spot overlap) in order to achieve hermeticity. The required amount of overlap may place constraints on how quickly successive laser pulses may be delivered without heating the device to an unacceptable level. Hence, the amount of time required to complete a hermetic seal weld (i.e., the cycle time) may be lengthened by the successive spot overlap requirement, as well as by the thermal constraints imposed by the presence of thermally-sensitive material.

Pulsed YAG lasers may be used for laser welding of hermetic seals on IMDs and related componentry. Pulsed YAG lasers used for seam welding on IMD components may typically operate at a maximum pulse rate of approximately 10 Hz (10 laser pulses per second), since higher pulse rates could result in unacceptable levels of heating and/or melting of components within an IMD. Components susceptible to heat in an IMD may, for example, include the separator material within the battery of an IMD during the welding of a hermetic seal on the battery housing.

Delivering laser pulses around the periphery of a component to form a hermetic weld seam may require a significant amount of time, depending on such parameters as the length of the weld path, the thermal sensitivity of nearby components, and the need for the laser pulses to overlap sufficiently to create a hermetic seal, as discussed above. Where the pulse rate is limited to 10 Hz, for example, this can result in cycle times of more than 100 seconds to complete a seam weld that is approximately 5 inches long using a spot size of approximately 0.025 inches diameter and an overlap of approximately 80%.

The delivery of laser energy to a particular location on a workpiece may be controlled using a number of different techniques, either individually or in combination. For example, in certain applications, the table or fixture on which the item to be welded (i.e., the workpiece) is disposed may be moved in two dimensions with respect to a laser beam that is stationary. This technique is sometimes referred to as an "x-y table" system. Such systems are typically used in applications requiring relatively slow movement of the workpiece with respect to the laser beam.

The amount of time required to perform certain welding operations, such as hermetic seal welds in IMDs and related componentry, imposes a constraint on manufacturing such devices due to the need to maintain a relatively low heat input to the device, as well as the need to achieve the degree of weld overlap necessary to achieve sufficient hermeticity. Additionally, the physical size of devices such as IMDs is constrained to a certain degree by the need to provide thermal barriers/shields to protect components within IMDs from the heat generated during the laser welding process.

BRIEF SUMMARY

Certain embodiments of the invention provide a method of laser welding that employs a plurality of initial welding locations distributed along a desired weld path to accomplish faster cycle times while minimizing heat input. A further embodiment incorporates mirrors and galvanometer motors to direct pulses of laser beam energy in sequences of pulses that follow a specified order or pattern along a desired weld path.

Certain embodiments of the invention include a method of laser welding that employs one or more mirrors and galvanometer motors to move laser beam energy along a substantially continuous weld path.

Certain embodiments of the invention include a system for laser welding that uses mirrors and galvanometer motors to move continuous wave laser beam energy along a substantially continuous weld path.

Described and depicted embodiments of the invention for fabricating welded IMD components provide an IMD housing formed by a process utilizing laser welding according to certain embodiments of the invention.

DETAILED DESCRIPTION OF THE ILLUSTRATED EMBODIMENTS

Figure 1:
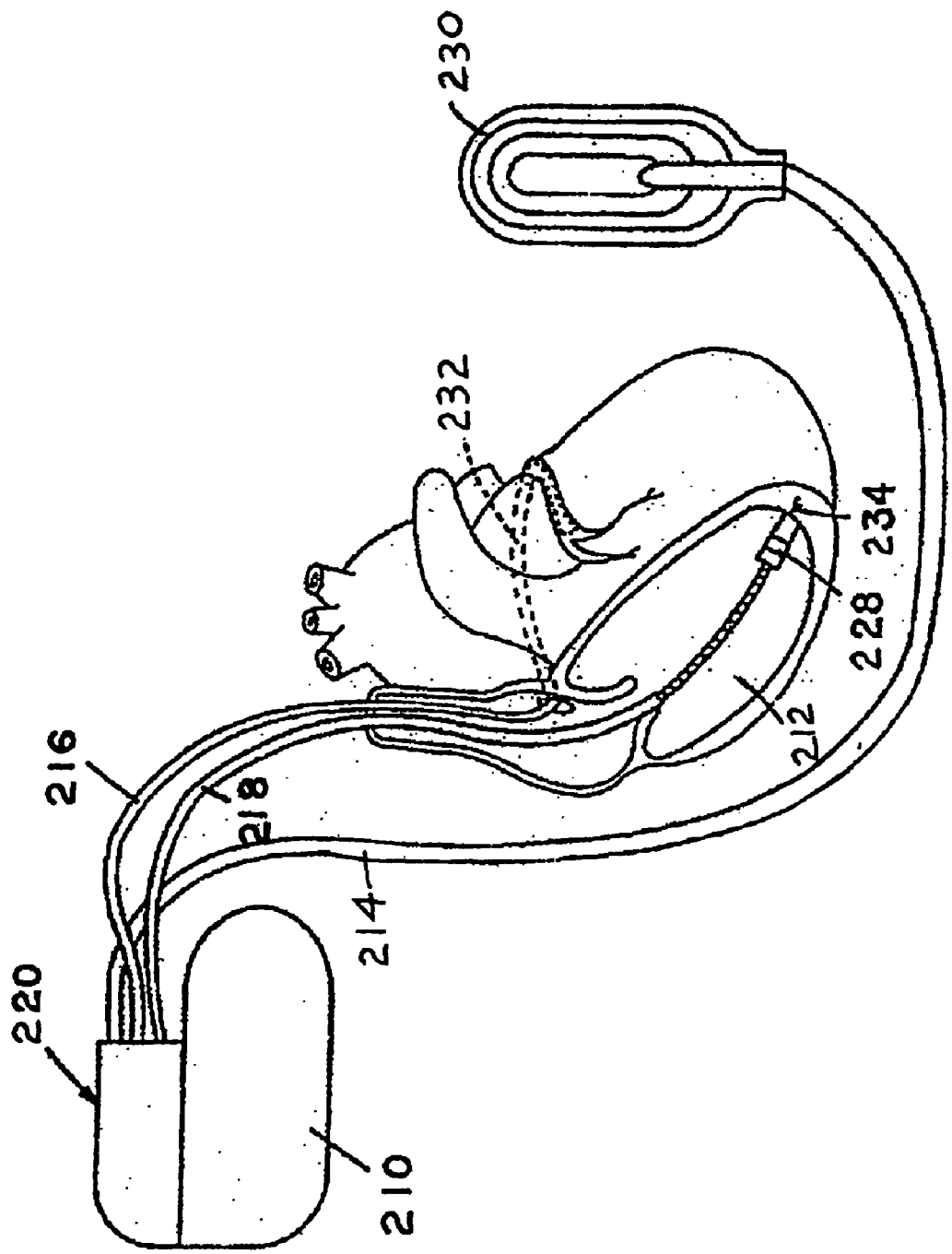
FIG. 1 is a simplified schematic view of an implantable medical device (IMD).

The following description of certain illustrated embodiments of the invention is presented to enable a person skilled in the art to appreciate certain aspects of the invention, including insubstantial modifications thereof, and to make and use the invention, as depicted and described as well as to illustrate other aspects of the invention. Various modifications to the illustrated embodiments will be readily apparent to those skilled in the art, and the generic principles herein may be applied to other embodiments and applications without departing from the spirit and scope of the invention as defined by the appended claims. Thus, the present invention is not intended to be limited to the embodiments shown, but is to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the invention. Skilled artisans will recognize the examples provided herein have many useful alternatives which fall within the scope of the invention.

For purposes of illustration only, the invention is described below in the context of implantable cardioverter defibrillators ("ICDs"). However, embodiments of the invention are not limited to ICDs, and may be employed in many various types of electronic and mechanical devices for treating patient medical conditions such as pacemakers, neurostimulators, and therapeutic substance delivery systems.

FIG. 1 is a simplified schematic view of an example of an implantable medical device ("IMD") 210, in accordance with an exemplary embodiment of the present invention. The IMD 210 is shown in FIG. 1 as an ICD with a relationship to the human heart. However, IMD 210 may assume a wide variety of forms. For example, IMD 210 may be an implantable cardiac pacemaker, such as that disclosed in U.S. Pat. No. 5,158,078 to Bennett et al.; U.S. Pat. No. 5,312,453 to Shelton et al.; or U.S. Pat. No. 5,144,949 to Olson, all hereby incorporated by reference, each in its entirety. Even further, IMD 10 may be an implantable neurostimulator, such as that described, for example, in U.S. Pat. No. 5,342,409 to Mullet; or an implantable drug pump; a cardiomyostimulator; a biosensor; and the like.

IMD 210 includes associated electrical leads 214, 216 and 218, although it will be appreciated that IMD 210 may include any number of leads suitable for a particular application. Leads 214, 216 and 218 are coupled to IMD 210 by means of a multi-port connector block 220, which contains separate ports for each of the three leads 214, 216, and 218.

Figure 2:
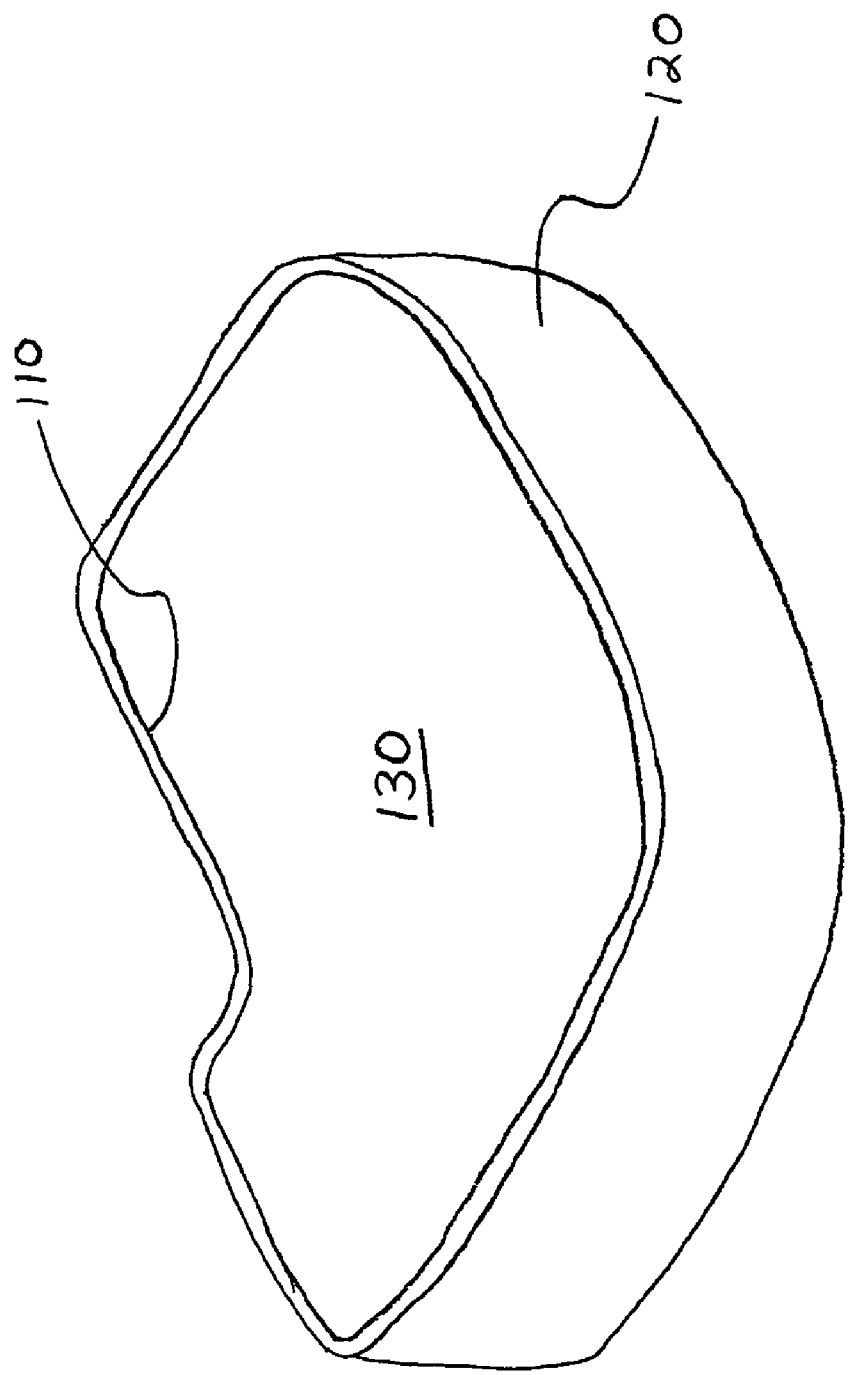
FIG. 2 is a perspective view of a battery housing for an IMD, illustrating a seam weld in accordance with an embodiment of the invention.

Laser welding has gained widespread acceptance in producing welds for a wide range of items, including implantable medical devices (IMDs) and related components. With respect to FIG. 1, a schematic view of the general environment of an IMD is shown. IMD 210 shown in FIG. 1 is a cardiac pacemaker system comprising pacing and sensing leads 214, 222, 230, and 240 attached to hermetically sealed enclosure 211 and implanted near human or mammalian heart 212. Pacing and sensing leads 214, 222, 230, and 240 sense electrical signals attendant to the depolarization and re-polarization of heart 212, and further provide pacing pulses for causing Laser welding techniques-may be used to provide seam welds, such as may be required in an IMD. An example of a seam weld that may be performed using laser welding techniques is shown in FIG. 2. FIG. 2 is a perspective view of a shallow drawn battery case for use in an IMD, illustrating a seam weld 110 that may be provided in accordance with an embodiment of the invention. In IMDs and related components, the seam weld may typically provide a hermetic seal. For example, in FIG. 2, the shallow drawn battery case 120 may be hermetically sealed to battery cover 130 along seam weld 110.

Figure 3:
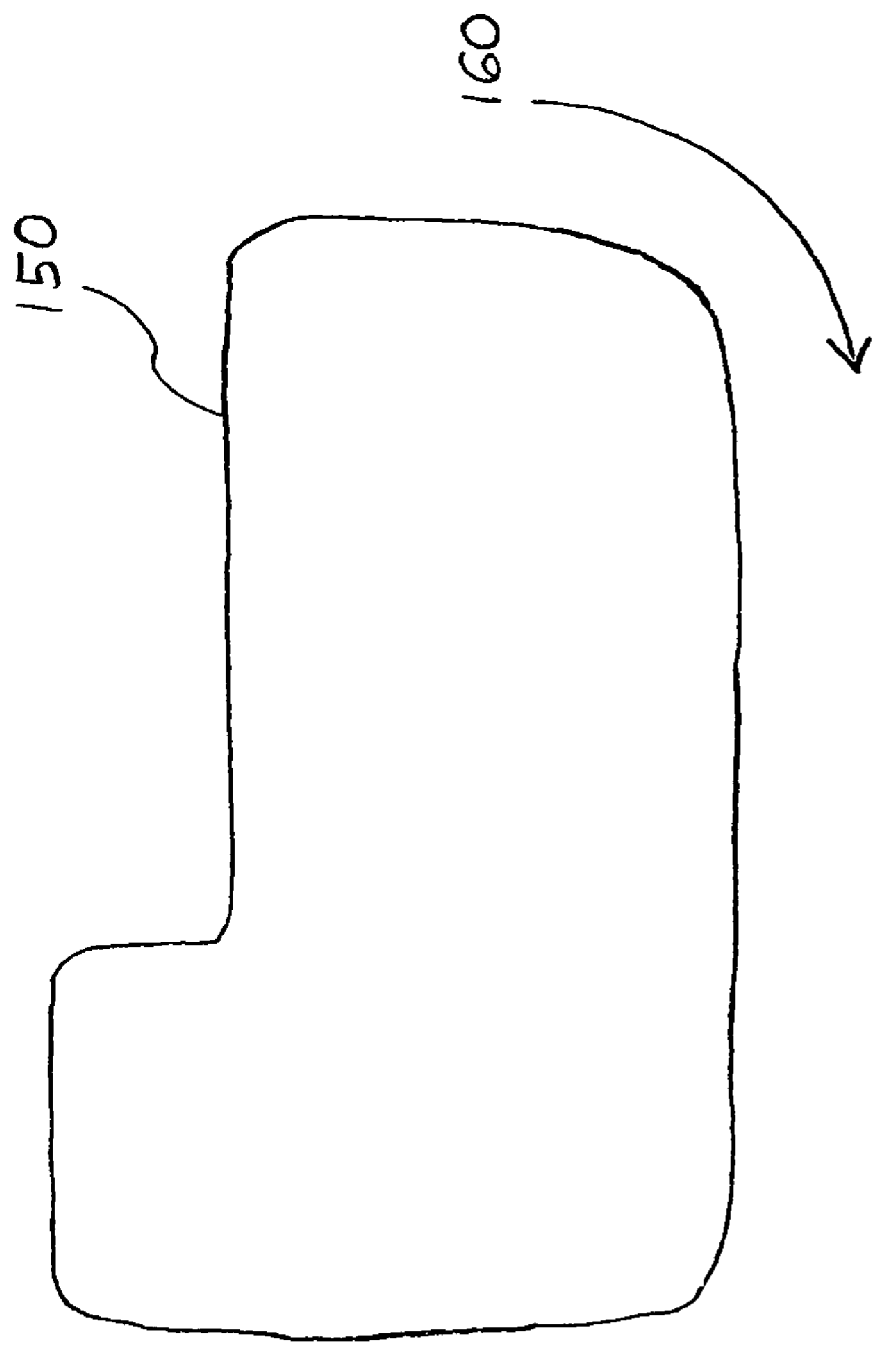
FIG. 3 is a top plan view of an exemplary weld path for laser welding the seam weld of FIG. 1.

FIG. 3 illustrates a top plan view of a weld path 150 for laser welding, for example, to form the seam weld 110 of FIG. 2. The weld path 150 as shown in FIG. 3 may be provided by either a continuous wave (CW) or pulsed laser welding technique. The weld path 150 follows the perimeter of the interface between the components or members to be welded, and defines the path that the laser energy will follow to perform the weld. The weld path 150 may also have a weld direction 160, indicating a reference direction of travel of the laser energy around weld path 150 in performing the weld. The choice of weld direction 160 may be somewhat arbitrary, and only serves as a reference direction to aid in the following description of the invention.

Figure 4:
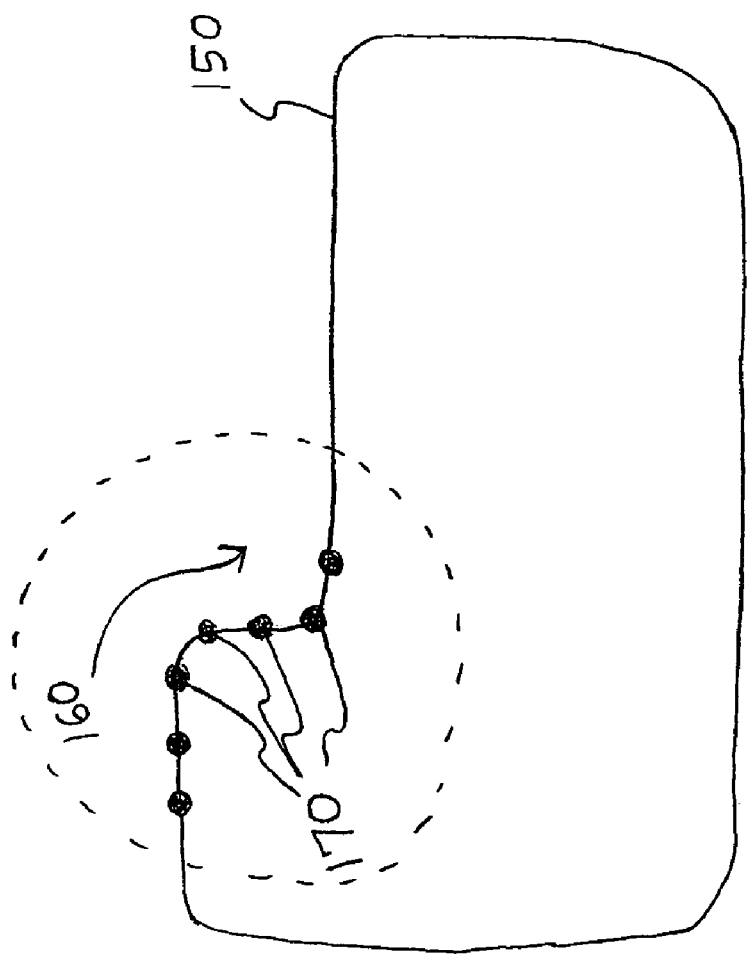
FIG. 4 is a top plan view of a weld path illustrating a pattern of successive spot welds delivered along the weld path.

FIG. 4 is a top plan view of the weld path 150 of FIG. 3, illustrating a pattern of successive weld points 170 delivered sequentially by a pulsed laser system (see FIG. 6) in a weld direction (depicted by arrow 160) along the weld path 150.

Figure 5:
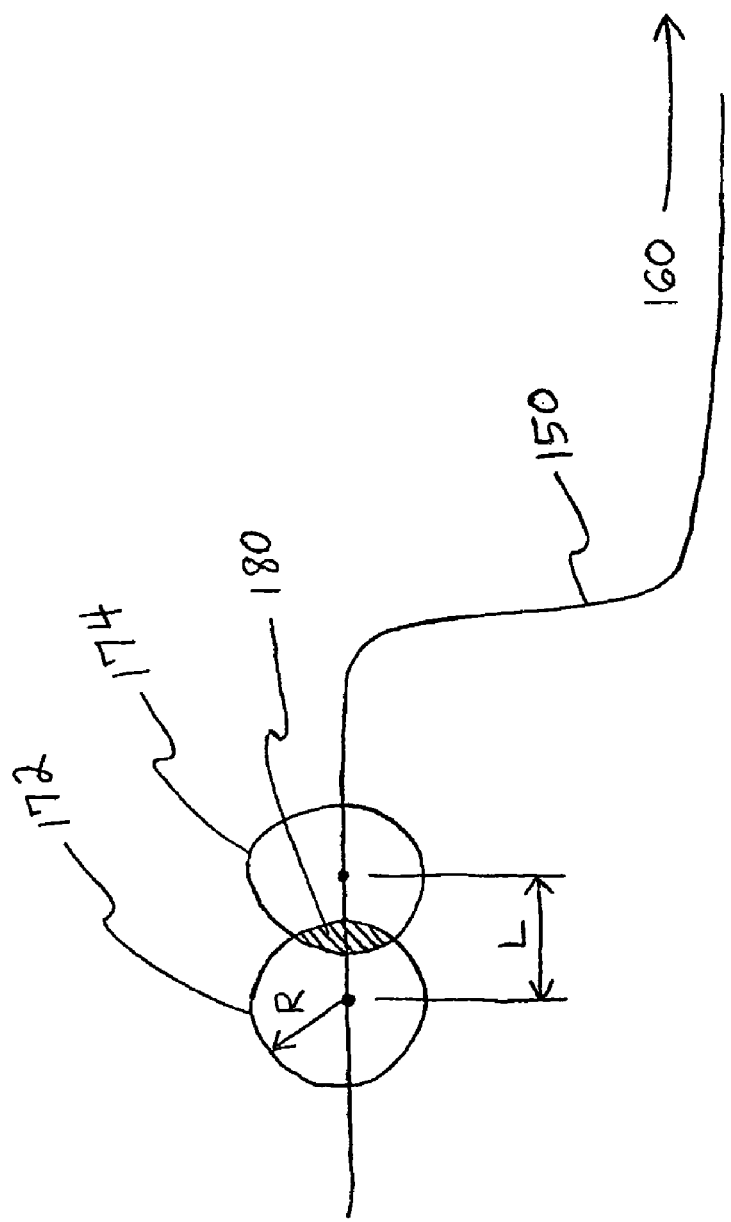
FIG. 5 is an enlarged view of the weld path of FIG. 3, illustrating weld overlap.

In forming a seam weld using a pulsed laser system, a certain amount of overlap between successive adjacent laser pulses may be desired, for example, to obtain a hermetic seal. FIG. 5 shows an enlarged view of the weld path area in FIG. 4, illustrating the concept of weld overlap. FIG. 5 shows two successive weld points 172, 174 each having a radius R and each having a surface area equal to $\pi R^2$. As shown, weld points 172, 174 are formed by delivering pulses of laser energy, first at weld point 172, then at weld point 174, by moving the focal point (i.e., the center) of the laser beam an incremental distance L in the weld direction 160 along the weld path 150.

The amount of weld path overlap 180 may be defined in a number of different ways. For example, the area 180 comprising the overlapping area between successive weld points 172, 174 may desirably be greater than some specified fraction of the surface area of each weld point. The amount of weld path overlap 180 may also be accomplished by setting the incremental distance L between successive weld points to a value less than or equal to some specified percentage of the radius R of the weld points. Alternately, weld overlap may be defined in other ways that can be expressed in terms of the incremental distance L between successive weld points, as would be apparent to one of ordinary skill in the art. Additionally, the amount of overlap may vary along the weld path, for example, to minimize heat input at particular locations by reducing the amount of overlap, so long as the minimum overlap needed for hermeticity is maintained. In some cases, a mathematical relationship that accounts for such parameters as the pulse rate, spot size, and allowable heat input may be derived to calculate the incremental distance L between successive weld points. Such a relationship might be as simple as $L=0.812*R$ for a given pulse rate, for example, where the number "0.812" might be referred to as the "overlap percentage factor." Of course, other overlap percentage factors can be used, as desired or required for a given application.

Due to thermal constraints (such as the presence of thermally-sensitive components), the frequency at which successive laser pulses can be delivered to a given location may be limited. For example, in certain applications, a pulse rate of 10 Hz (10 laser pulses per second) may be the maximum laser pulse rate that can be used without exposing thermally-sensitive components to an unacceptable level of heat input. In applications where each successive laser pulse may be moved at most an incremental distance L (to obtain sufficient weld overlap for a hermetic seal, for example), a constraint is effectively placed on the amount of time required to perform a complete seam weld around an entire weld path 150. For example, if the incremental distance L is equal to or less than about 0.005 inches, and the length of the weld path is 5 inches, a total of 1000 weld points (and hence, 1000 laser pulses) would be required to complete the seam weld. If 10 Hz is the highest pulse rate that can be used with an incremental distance of 0.005 inches without exceeding thermal constraints, it would take 100 seconds to complete a 5 inch long seam weld (1000 pulses/10 pulses per second=100 seconds). Thus, the desire for weld overlap in the presence of thermally-sensitive components imposes a significant time constraint on performing certain types of seam welds.

As noted above, the delivery of laser energy to a particular location on a workpiece may be controlled using an "x-y table" system in which table or fixture on which the item to be welded (i.e., the workpiece) is disposed may be moved in two dimensions with respect to a laser beam that is stationary. Such systems are typically used in applications requiring relatively slow movement of the workpiece with respect to the laser beam.

Certain embodiments of the present invention include the ability to control the delivery of laser energy to a particular location on a workpiece through the use of a steered or directed laser beam system. Steered or directed laser beam systems move the laser beam with respect to the workpiece to direct laser energy to a particular location. These techniques have been developed for applications in which workpieces need to be processed at relatively high speeds to be economical. Such steered or directed laser beam systems typically use linear motors and/or operate using a "galvanometer system." A galvanometer system (or "galvo system") employs mirrors for reflecting laser beam energy to direct the focal point of the laser beam to a desired location on the workpiece. The position of the mirrors is adjusted, typically using a galvo system under computer control, to change the angle of the mirrors, and hence, the position of the focal point of the laser beam on the workpiece.

Laser energy may also be delivered to the workpiece and directed to a particular location by using traditional optics (i.e., focusing lenses, mirrors, etc.), or a fiber-optic beam delivery (FOBD) system, or some combination thereof. When traditional optics are used, the laser may, for example, be positioned near the top of the workstation or fixture, and a mirror may be positioned at a certain angle and location relative to the laser source to direct the laser beam through a focusing lens and to a particular location on the workpiece. An FOBD system uses an optical cable to deliver the laser energy to the workstation, enabling the laser source to be located remotely from the workpiece during welding, if desired. FOBD systems may be configured to permit the output of one laser source to supply the laser energy to be used at several workstations in different locations.

Figure 6:
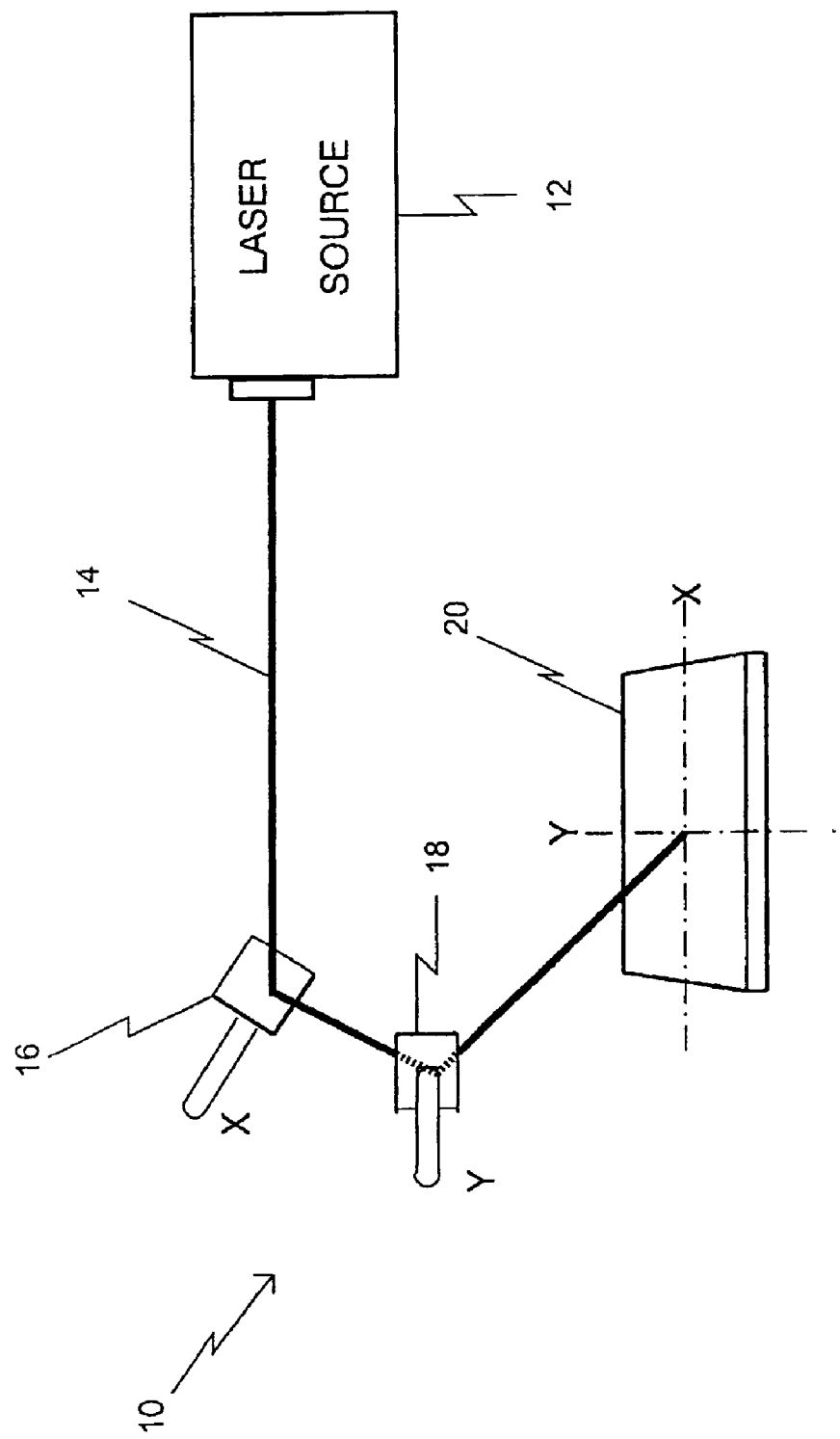
FIG. 6 is a schematic diagram of a typical prior art galvo-steered laser beam system.

FIG. 6 illustrates a typical galvo-steered laser beam system 10. Galvo system 10 includes laser source 12 emitting laser beam 14. Mirrors 16 and 18 are provided and arranged to control the "x" (horizontal) position and the "y" (vertical) position, respectively, of the focal point of laser beam 14 on workpiece 20. This position control is achieved by adjusting the reflectance angles of mirrors 16 and 18. Mirrors 16 and 18 are typically under computer control, and velocities of the focal point of laser beam 14 may exceed 100 in/sec in some applications.

As would be appreciated by a person having ordinary skill in the art, numerous minor variations and combinations of the x-y tables and steered laser systems described above can be envisioned and configured to facilitate the delivery of laser energy to particular locations on a workpiece. For example, an x-y table that also provides movement in the vertical ("z") direction may be used in conjunction with a steered laser system to perform a weld along a three-dimensional weld path. Similarly, a workstation fixture or table could be configured to rotate about an axis to perform circular or cylindrical laser weld patterns, as described below with respect to FIG. 12. These variations and combinations are illustrative of embodiments that fall within the scope of the invention.

Figure 7A:
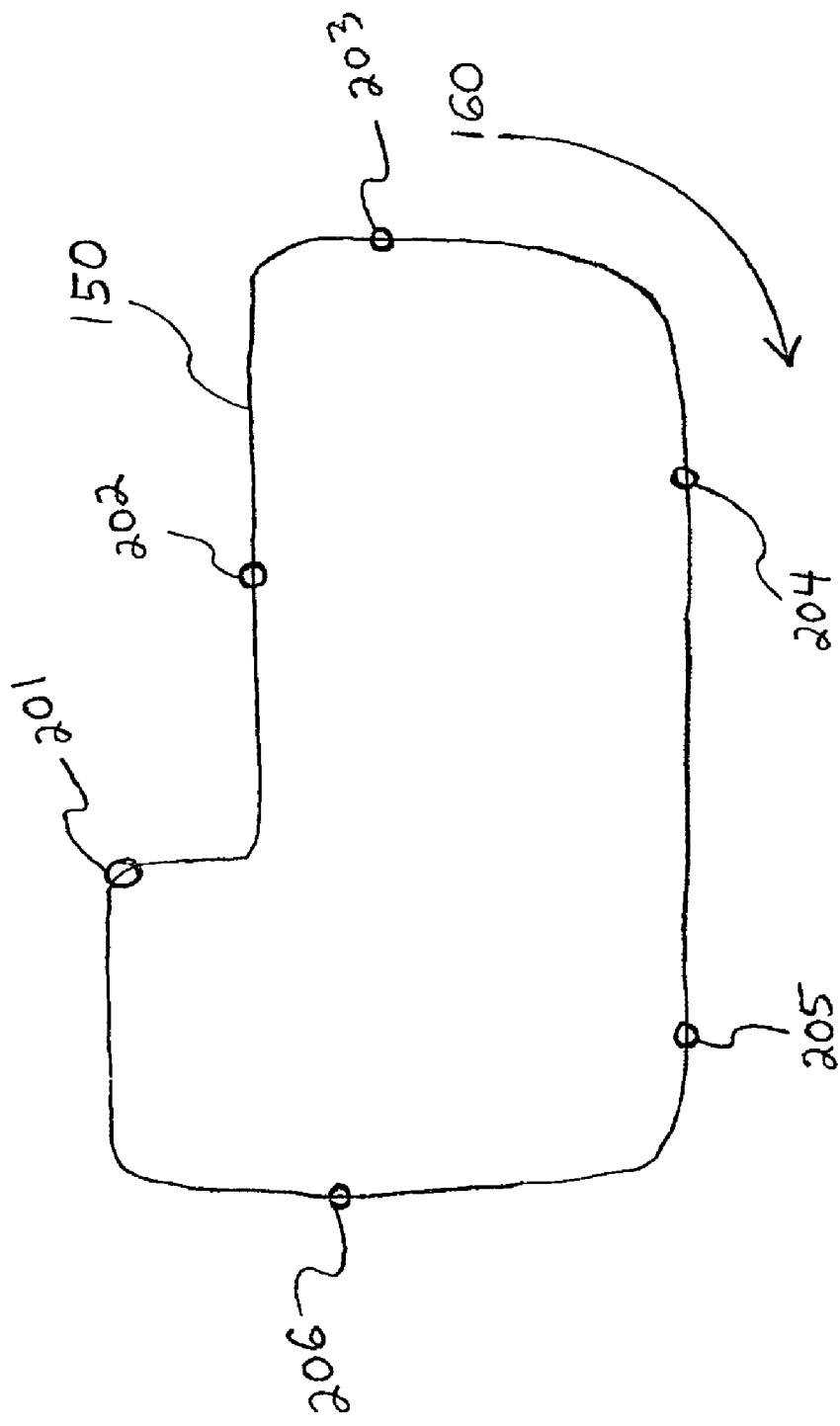
FIG. 7(a) is a top plan view of a weld path for pulsed laser welding employing a plurality of initial welding locations in accordance with an embodiment of the invention.

FIG. 7(a) depicts a top plan view of a weld path 150 for pulsed laser welding employing a plurality of initial welding locations in accordance with certain embodiments of the invention. FIG. 7(a) illustrates an embodiment of the invention using six initial welding locations 201-206 spaced about the weld path 150. By employing a plurality of initial welding locations 201-206 spaced about the weld path 150, the amount of time required to complete a seam weld along the entire weld path 150 can be reduced greatly. By simultaneously welding from the initial welding locations 201-206, the total time needed to complete a seam weld can be reduced to a fraction of the time required to perform the weld using a single initial welding location. In one embodiment, the plurality of initial welding locations 201-206 can be spaced substantially evenly about the weld path 150.

To truly perform "simultaneous" welding at a plurality of locations would likely require either a plurality of laser sources, or a very powerful laser source that is split into a plurality of beams and directed along separate weld paths. Thus, true simultaneous welding may not be feasible on the basis of cost, space, complexity, or for other reasons.

Certain embodiments of the present invention provide nearly simultaneous welding at a plurality of initial welding locations. In some embodiments, a galvo-steered laser system is used to deliver pulsed laser energy in a specified pattern. Instead of delivering successive laser pulses an incremental distance L from the previous weld point and proceeding in a single, continuous loop around the weld path, a sequence of pulses is first delivered to a plurality of initial welding locations 201-206, followed by successive sequences of pulses which are delivered at an incremental distance L from the weld points corresponding to the preceding sequence of pulses. This process is continued until the entire weld path 150 has been welded. The net effect of the multiple initial welding location sequence of pulses is that much higher overall pulse rates can be employed while maintaining a relatively low "effective" pulse rate at any one of the weld locations along path 150. For example, a limit of a 10 Hz pulse rate may be imposed due to thermal considerations. Using a multiple initial welding location technique with six initial welding locations 201-206 (as shown in FIG. 7(a)) allows for the use of an overall pulse rate of 60 Hz, while yielding an effective pulse rate of 10 Hz between adjacent pairs of initial welding locations. This satisfies the thermal criterion, while reducing the time to perform the entire weld to roughly one-sixth.

Figure 8:
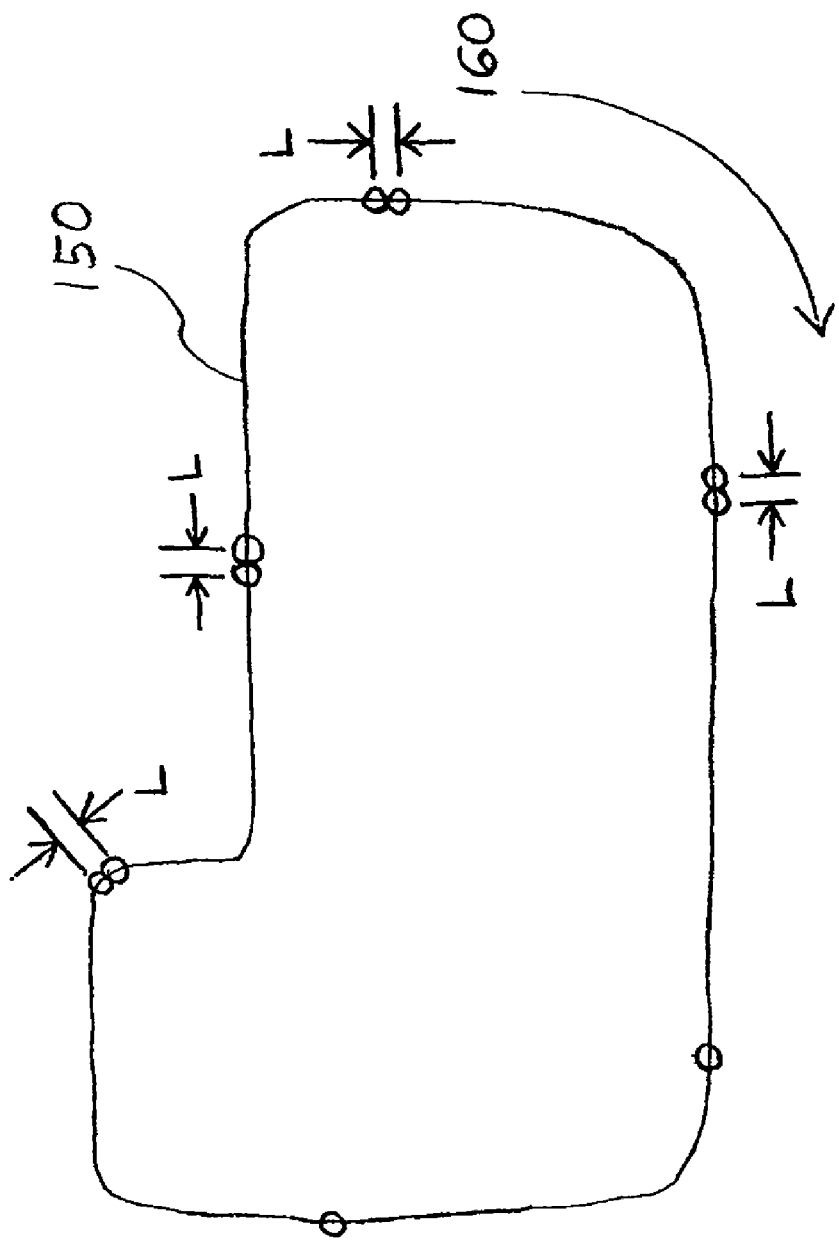
FIG. 8 is a top plan view of a weld path for pulsed laser welding, illustrating a first and second sequence of pulses according to an embodiment of the invention.

FIG. 8 depicts a top plan view of a weld path 150 for pulsed laser welding illustrating a completed first sequence of pulses and a partially completed second sequence of pulses, where each weld point in the second sequence of pulses is located an incremental distance L from the corresponding weld point in the first sequence of pulses.

Figure 7B:
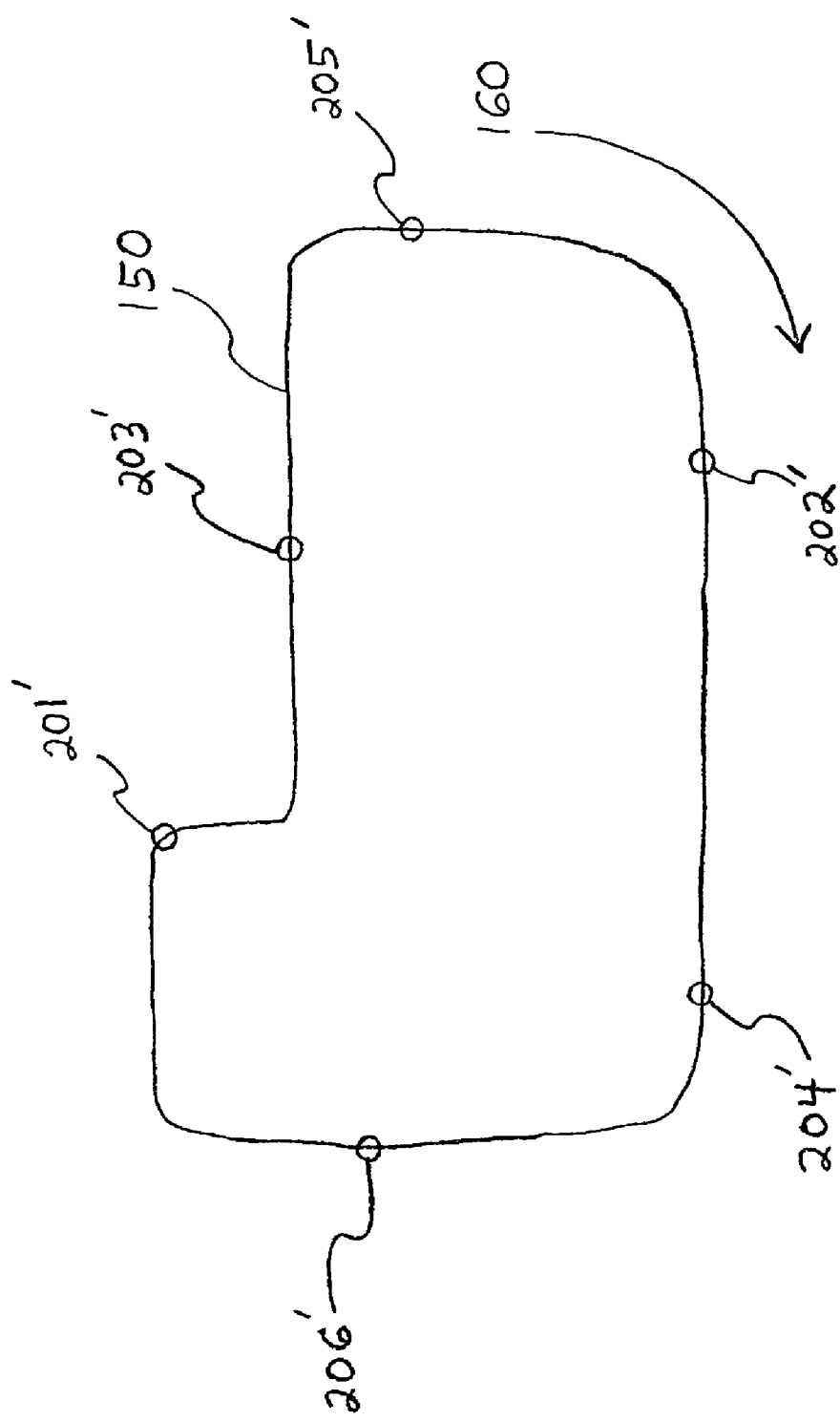
FIG. 7(b) is a top plan view of a weld path for pulsed laser welding employing a plurality of initial welding locations in accordance with an embodiment of the invention.

In one embodiment of the invention, the order and direction in which the pulses are delivered within a given sequence of pulses need not follow the weld direction 160 around the weld path 150. For example, a sequence of pulses may follow the order shown by the initial welding locations 201'-206' in FIG. 7(b), or any other pattern capable of being repeated in successive sequences of pulses. The order of laser pulses shown by initial welding locations 201'-206' in FIG. 7(b) may, for example, reduce mechanical stresses in the components to be welded by evenly distributing the load across opposite sides of the component to be welded in alternating pulses.

In another embodiment, the effective pulse rate between initial welding locations may be reduced sufficiently to allow for a significant reduction in the total heat input to the device. One way to accomplish this may be to maintain the overall laser pulse rate at a particular frequency while reducing the effective pulse rate between adjacent initial welding locations. Thus, in a 10 Hz pulsed laser system with 10 initial welding locations, the total cycle time for the weld would remain the same, but the effective pulse rate at the initial welding locations would be 1 Hz (10 Hz/10 initial welding locations=1 Hz), potentially offering a significant reduction in the heat input. This may be useful, for example, to allow for the design of smaller IMDs and related components and/or thinner materials that heretofore were deemed acceptable for laser welding, including non-metallic materials (e.g., resin-based materials, metal-coated polymers, etc.) since traditionally a portion of these items typically include thermal barriers and insulation material designed to withstand the heat input associated with the welding process.

Figure 7C:
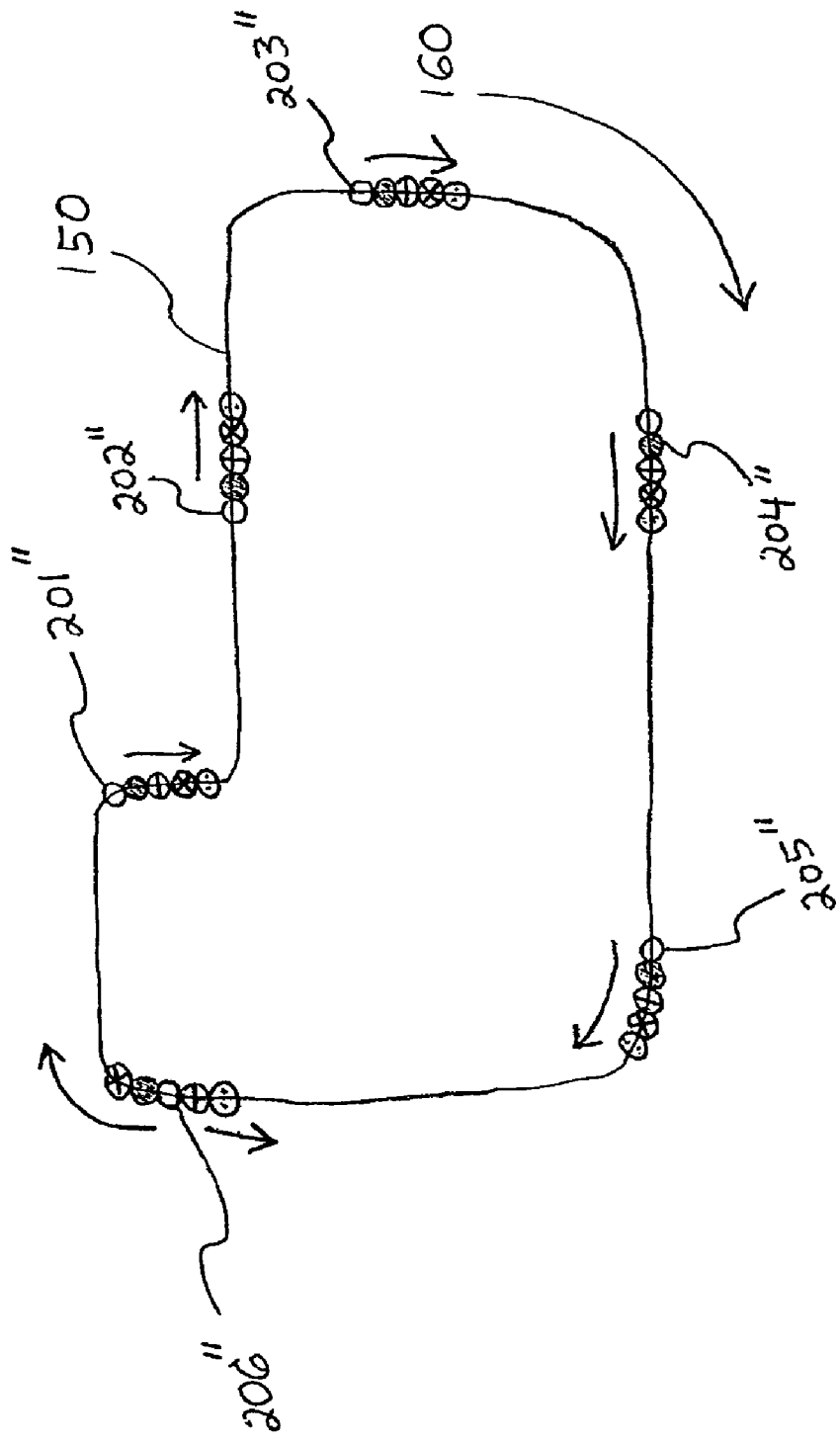
FIG. 7(c) is a top plan view of a weld path for pulsed laser welding employing a plurality of initial welding locations in accordance with an embodiment of the invention.

In yet another embodiment of the invention, the spacing of the initial welding locations and/or the placement of successive weld points may be adapted to provide an effective pulse rate that varies around the weld path. This embodiment might be useful, for example, where certain areas near the weld path are more thermally-sensitive than others. One example of this technique is shown in FIG. 7(c). In FIG. 7(c), one of the initial welding locations 206" is positioned closer to one adjacent initial welding location 201" than the other 205". On the delivery of each successive sequence of laser pulses, the weld points that correspond to initial welding location 206" are alternately delivered on either side of initial welding location 206" an incremental distance L from the preceding corresponding weld point. Thus, the effective pulse rate between initial welding locations 206" and 201" in FIG. 7(c) may be less than the effective pulse rate along other portions of the weld path 150. Note that in this embodiment, a weld may be formed in a direction opposite to the weld direction 160, as is shown by the weld points beginning at initial welding location 206" and moving toward initial welding location 205" in FIG. 7(c).

Figure 9:
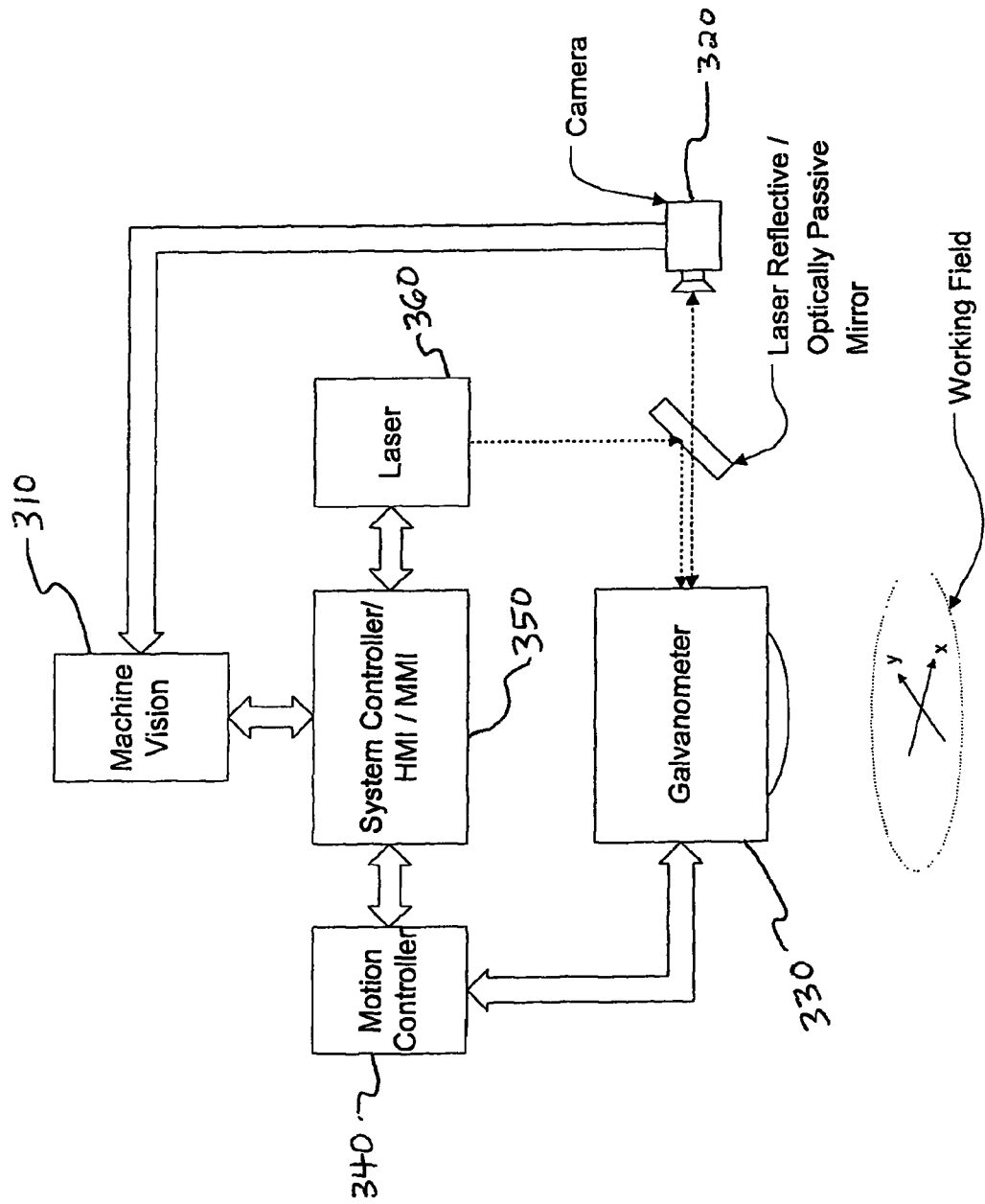
FIG. 9 is a schematic diagram of a galvo-steered laser beam system employing a vision acquisition system.

FIG. 9 is a block diagram showing an overall system for performing laser welding in accordance with certain embodiments of the invention. In the embodiment shown, a process for laser welding may incorporate the steps as described below. A plurality of locations of the intended weld are visually acquired by machine vision means 310, using a visual image of the item to be welded obtained by camera 320, galvanometer 330, and motion controller 340. The plurality of locations, or "pick points," are stored by machine vision 310, for example, using memory. The system controller 350 generates a weld path using the plurality of pick points stored in machine vision 310. The system controller 350 may use an interpolation algorithm to generate the weld path. The weld path is next divided into at least two segments that may be substantially equal in length. The segmentation step may be facilitated, for example, by dividing the total number of weld points that form the weld path by an integer (i.e., the desired number of weld path segments). The system controller 350 then generates the sequencing pattern necessary to perform the multiple initial welding location welding process along the weld path. The system controller 350 then controls the precise timing of the laser pulses from laser source 360, as well as the precise positioning of reflective positioning mirrors and focusing optic lenses (not shown) via motion controller 340 and galvanometer 330. The laser pulses are delivered sequentially along each of the segments of the weld path until the weld is complete.

The weld points that form the entire weld path, as well as the patterns of welds that form the multiple initial welding location sequences of weld points, may be stored in memory, for example, in motion controller 340. This enables the stored weld paths and sequences to later be recalled by an operator for use in welding other similarly sized and shaped workpieces. The stored weld path and sequence data may comprise spatial data that is either two- or three-dimensional.

FIG. 10(a) provides additional details of galvanometer 330. In the embodiment shown in FIG. 10(a), galvanometer 330 comprises two high speed galvo motors 380, each adapted to control a positioning mirror 390 attached thereto. Galvanometer 330 may further comprise focusing lens 396 for focusing the laser beam on the item(s) being welded.

Figure 10:
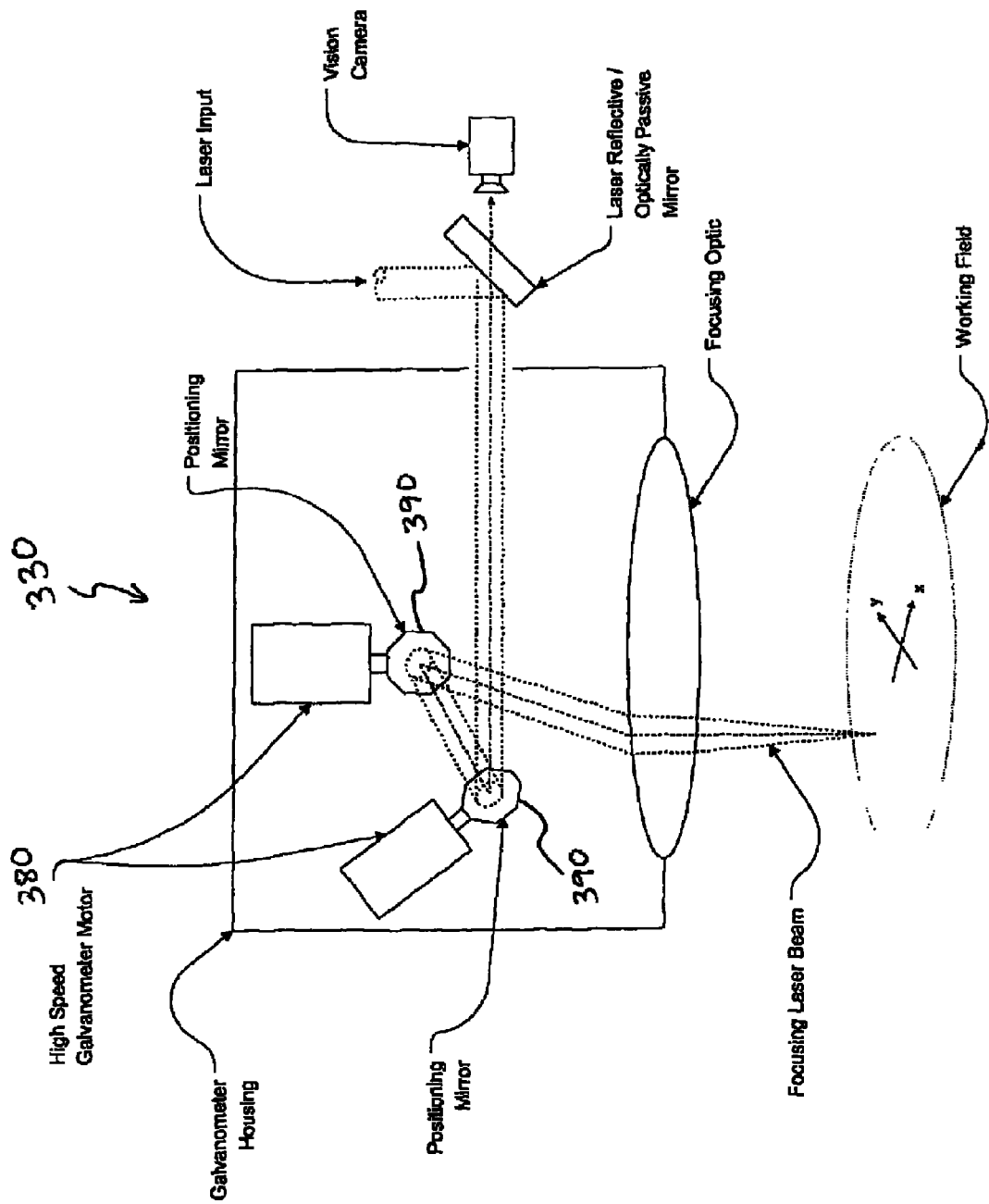
FIG. 10(a) is a schematic diagram showing a galvanometer for use in a galvo-steered laser beam system.
FIG. 10(b) is a schematic diagram showing a galvanometer for use in a galvo-steered laser beam system incorporating a dynamic Z focusing optic.
Figure 11:
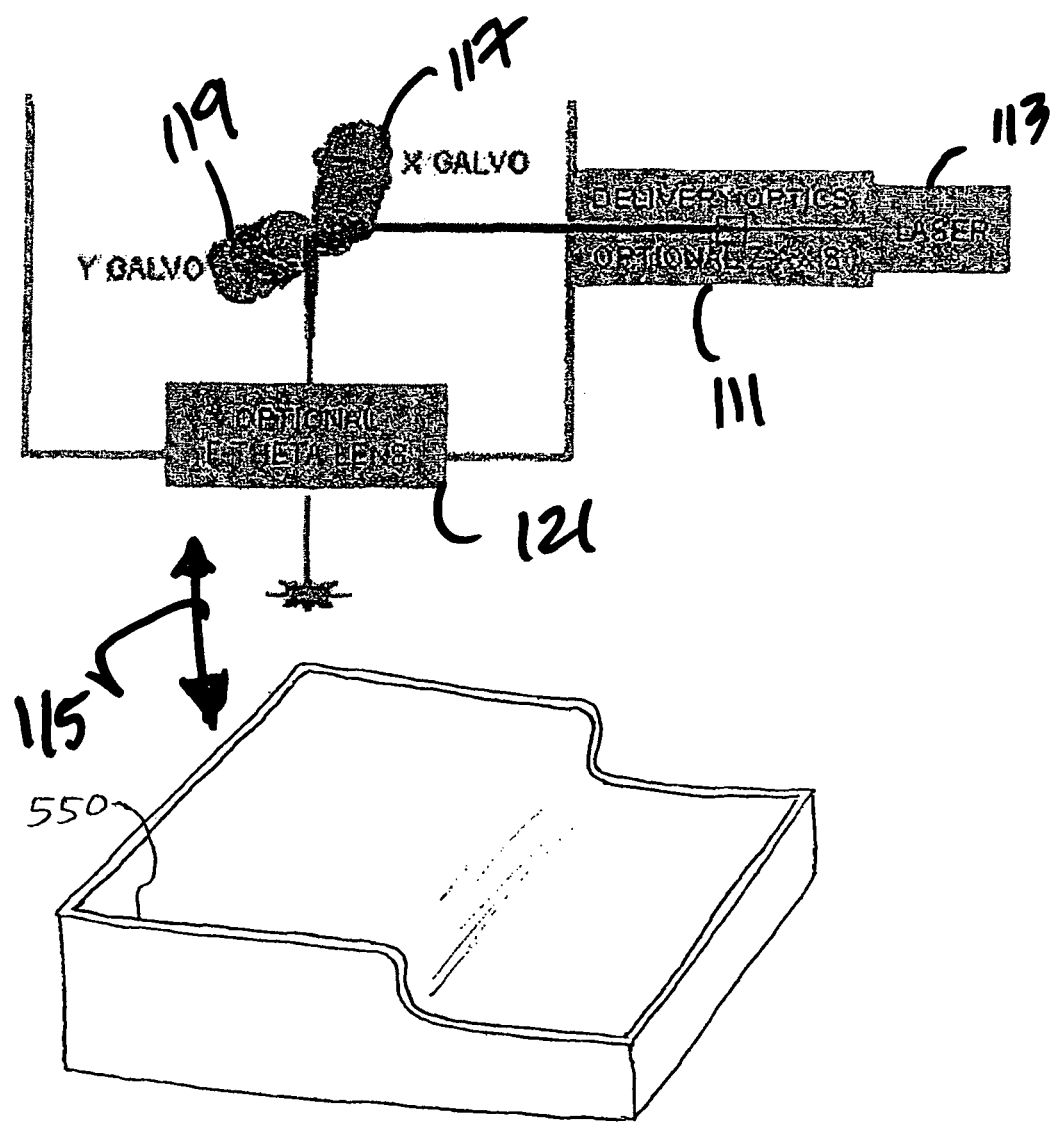
FIG. 11 is a perspective view of a laser welding system employing a "dynamic Z" galvo-delivered laser in accordance with an embodiment of the invention.

The embodiment shown in FIGS. 9 and 10(a) provides laser welding along a two-dimensional weld path. As would be appreciated by one of ordinary skill in the art, the embodiment shown in FIGS. 9 and 10 could be utilized to perform a laser weld along a three-dimensional weld path, for example, by incorporating motion control of the workpiece in a third dimension (i.e., vertical or Z-direction). Another way of achieving three-dimensional weld paths is shown in FIG. 11. FIG. 11 is a perspective view of a laser welding system according to an embodiment of the invention employing a "dynamic Z" galvo-delivered laser. This type of laser system is able to vary the focal length of the laser energy, thereby adding the ability to perform a laser weld on a workpiece component that has a three-dimensional weld path 550.

Figure 10B:
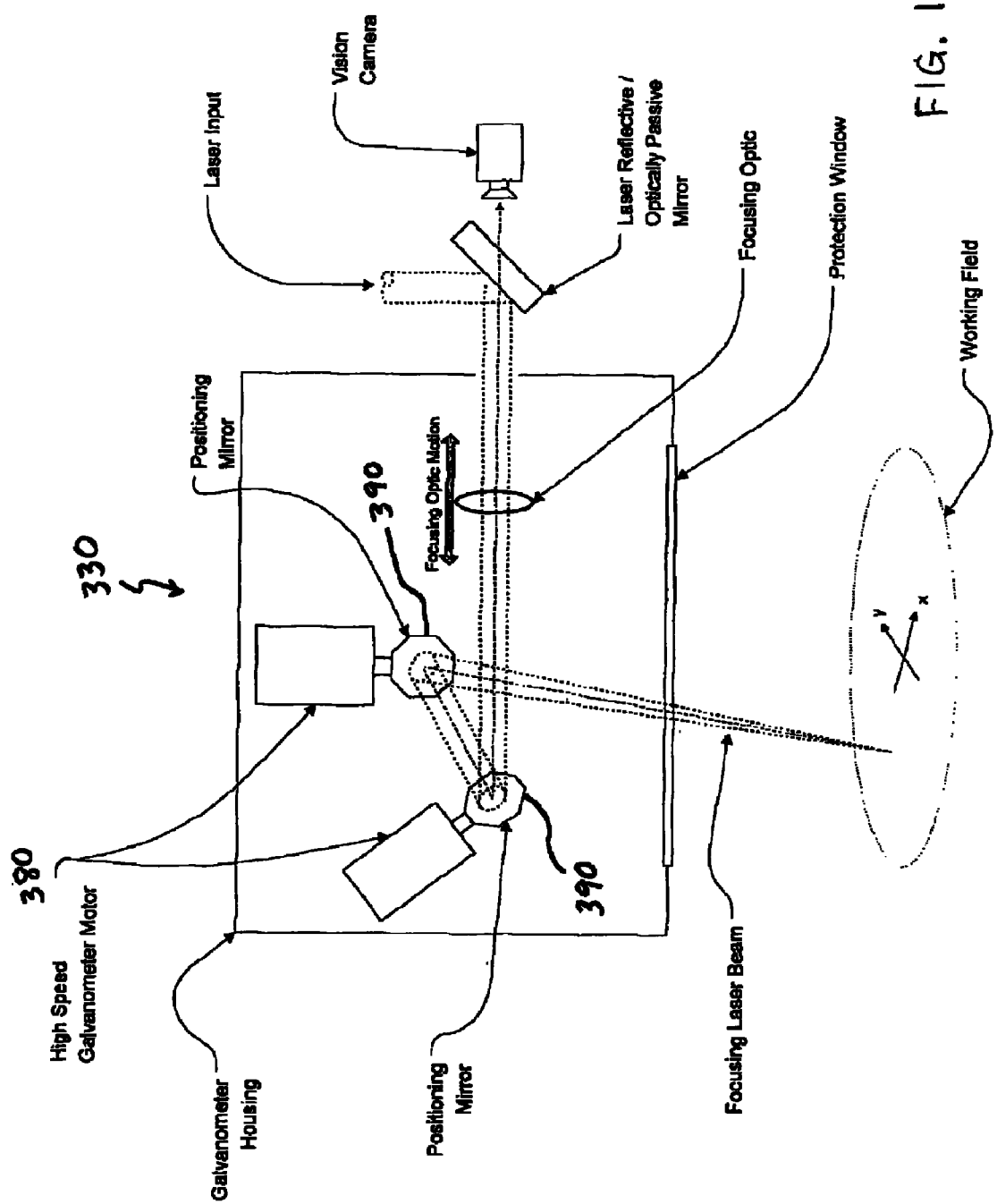

FIG. 11 illustrates the use of a dynamic Z lens 111 coupled to a laser source 113, where the focal length of the laser energy is varied by movement of the dynamic Z lens 111, which in turn varies the focal length in the z-direction, that is, vertically (denoted by arrow 115). This arrangement is also depicted schematically in FIG. 10(b). Movement of the dynamic Z lens 111 may be accomplished by mounting the lens 111 on a linear stage motor/mechanism (not depicted) capable of varying the position of the dynamic Z lens in the appropriate direction and at the speeds required, such as a servo-controlled or step-controlled motor, a threaded shank, a pulley system and the like. The focal length 115 can be stored in memory and/or "programmed" as a third dimension in the galvanometer field (in addition to an x-axis galvo device 117 and a y-axis galvo device 119). In addition, an optional f-theta lens 121 or the like. An example of such an f-theta lens comprises a condensing lens for the high speed laser scanning systems that have been utilized for laser materials processing. Such a lens has been recently used for laser drilling of microvias in multilayer printed circuit boards, and provides high precision and high performance. The lens are typically assembled with multiple element lenses having diffractive/refractive hybrid lens portions, particularly if relatively large (e.g., on the order of over 100-mm-diameter). A conventional f-theta lens for the microvia drilling consists of refractive lenses having spherical or aspherical surface profiles. For instance, f-theta lenses provided by multinational corporation Sumitomo Electric Industries, Ltd. employs diffractive/refractive hybrid lenses that have blazed micro-relief surface structures on their aspherical surfaces. The element lenses are made from zinc selenide (ZnSe*) which is optically more stable on temperature than germanium (Ge). The temperature dependency of the lens (including the accuracy of drilling positions) is consequently purportedly improved to five times that of the conventional lens. The achromatic properties of the lens against the wavelength fluctuations of actual CO2 lasers used for the microvia drilling, is also advanced up to ten times of that of the conventional lens.

Figure 12:
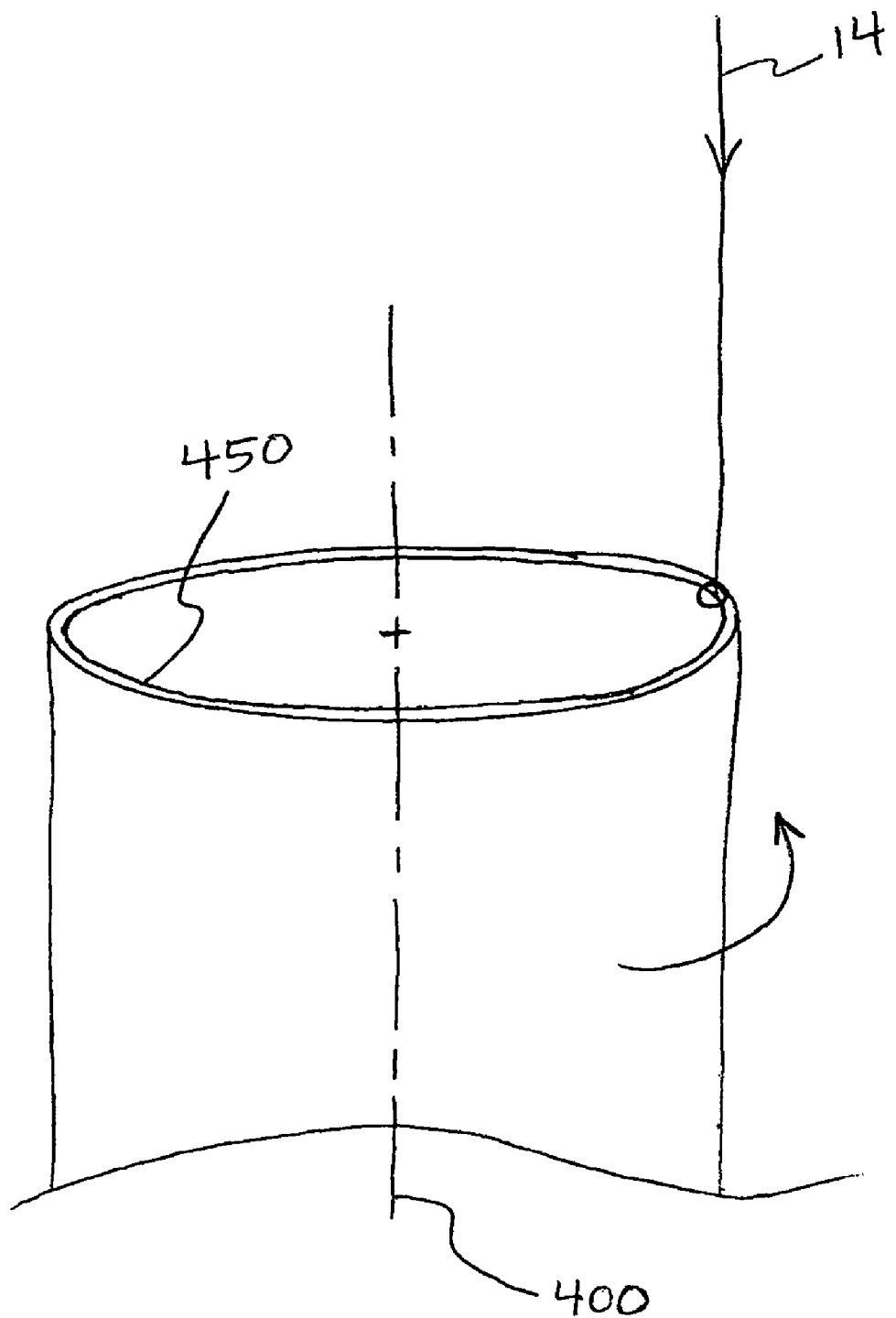
FIG. 12 is a perspective view of a laser welding system in accordance with an embodiment of the invention illustrating a workpiece that is rotated about an axis.

FIG. 12 depicts a perspective view of a method of laser welding in accordance with an embodiment of the invention illustrating a circular or cylindrical workpiece that is rotated about an axis 400 to perform a seam weld along circular weld path 450 in accordance with an embodiment of the invention. As illustrated in FIG. 12, a circular or cylindrical workpiece is rotated about an axis 400, and a laser source (not shown) provides a pulsed laser beam 14 along circular weld path 450. The laser pulses can be timed such that a plurality of initial welding locations is spaced evenly around the weld path and comprises the first sequence of pulses delivered. Successive sequences of pulses are then delivered to form weld points at an incremental distance from each of the weld points formed from the preceding sequence of pulses until a weld is formed along the entire weld path 450.

Figure 13:
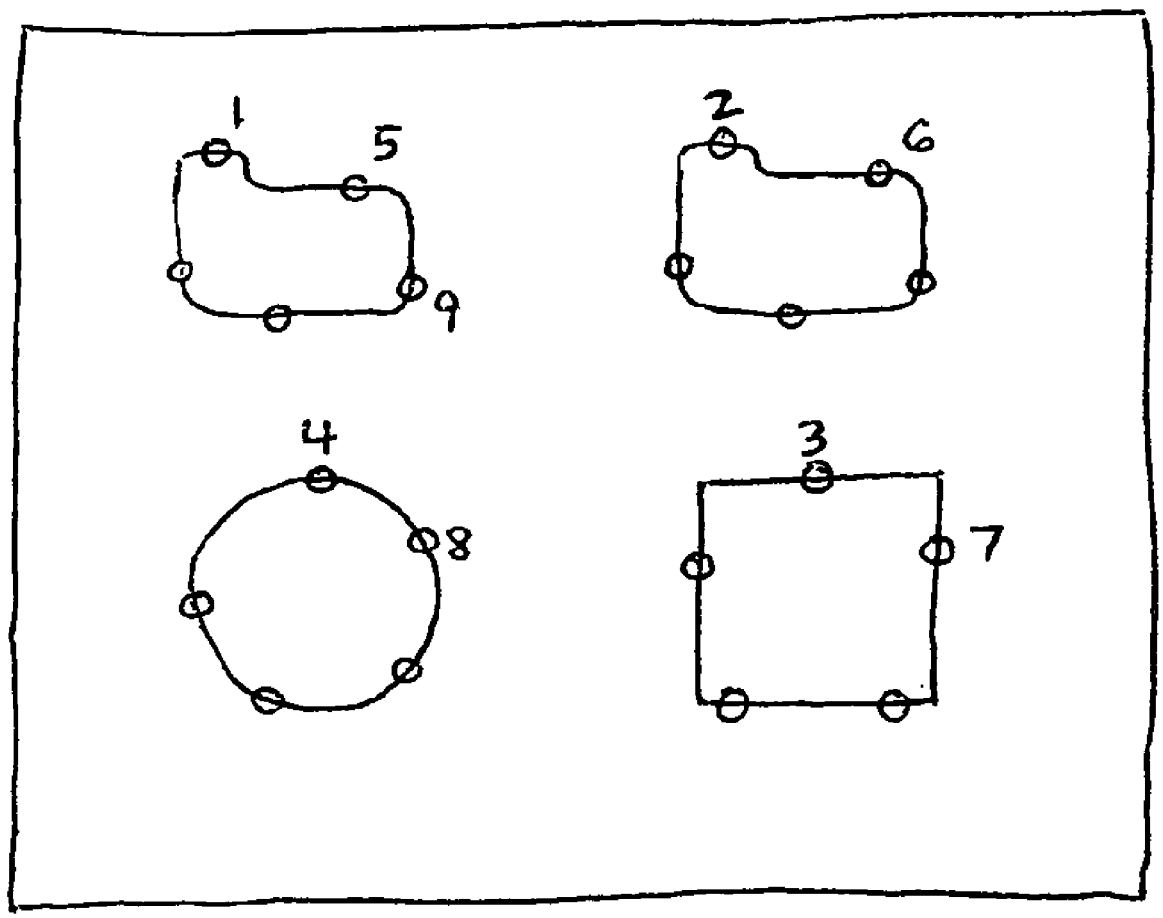
FIG. 13 is a top plan view of a workstation with a plurality of members to be welded according to an embodiment of the invention.

FIG. 13 depicts a top plan view of a workstation fixture or table with a plurality of members to be welded according to an embodiment of the invention. In the example shown in FIG. 13, four items are placed on a fixture, and a galvo-delivered laser system delivers a sequence of four pulses 1-4 that comprise the first initial welding location of each of the four items. Second and successive sequences of pulses are then delivered, first to complete the initial welding location pattern of each item, then to deliver weld points to locations that are an incremental distance from preceding points. As would be appreciated by one of ordinary skill in the art, the embodiment of the invention shown in FIG. 13 may employ a plurality of members having a variety of different sizes and shapes without materially departing from the scope of the invention. This might allow, for example, the nearly simultaneous welding of an IMD housing, such as a housing for the entire IMD, an IMD battery, or one or more IMD capacitors, as may be used in an implantable cardioverter defibrillator (ICD).

Figure 14:
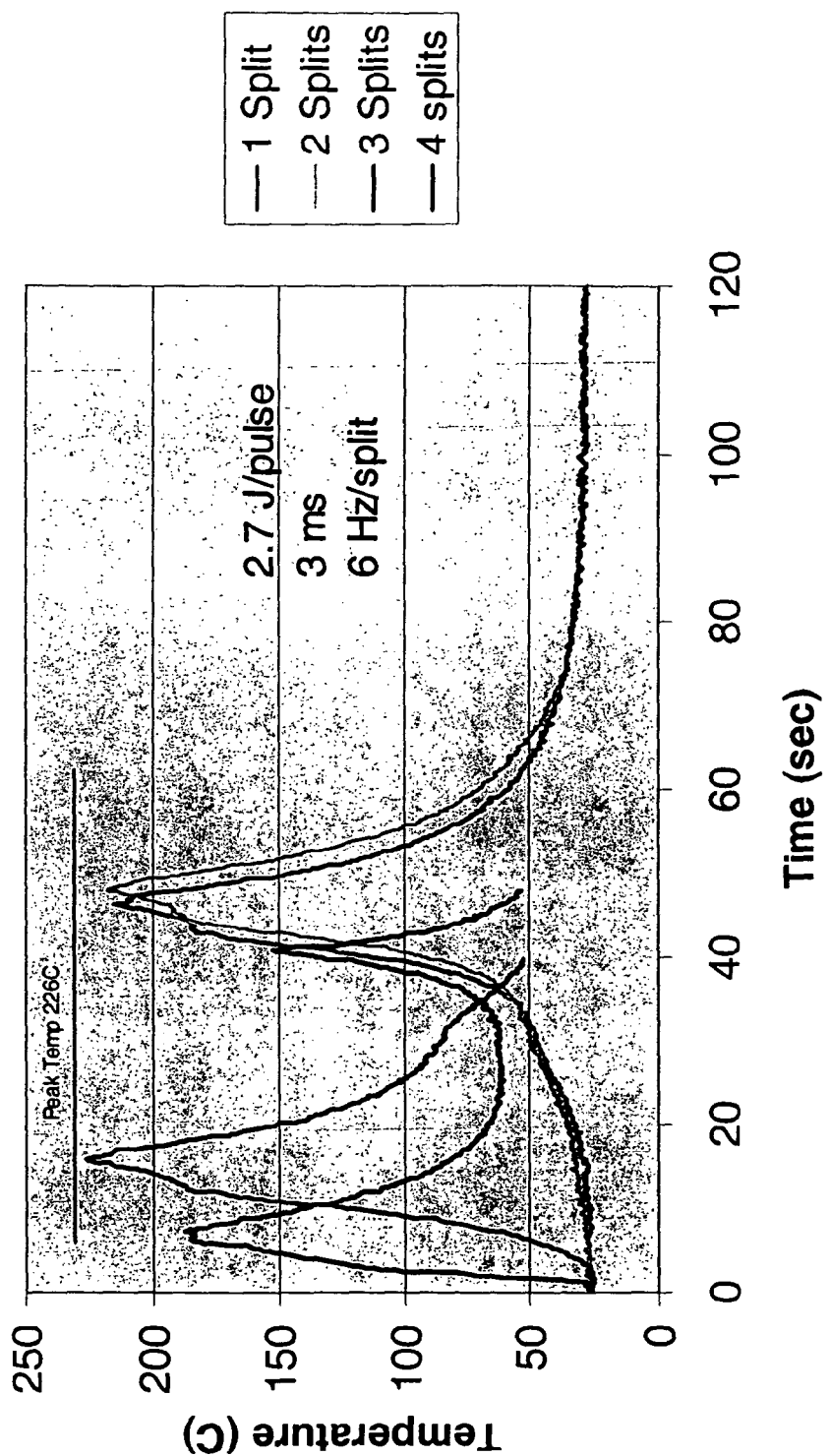
FIG. 14 and FIG. 15 depict plots of temperature as a function of time for a pulsed laser welding method according to embodiments of the invention, showing reduced cycle times (FIG. 14) and lower peak temperatures (FIG. 15).
Figure 15:
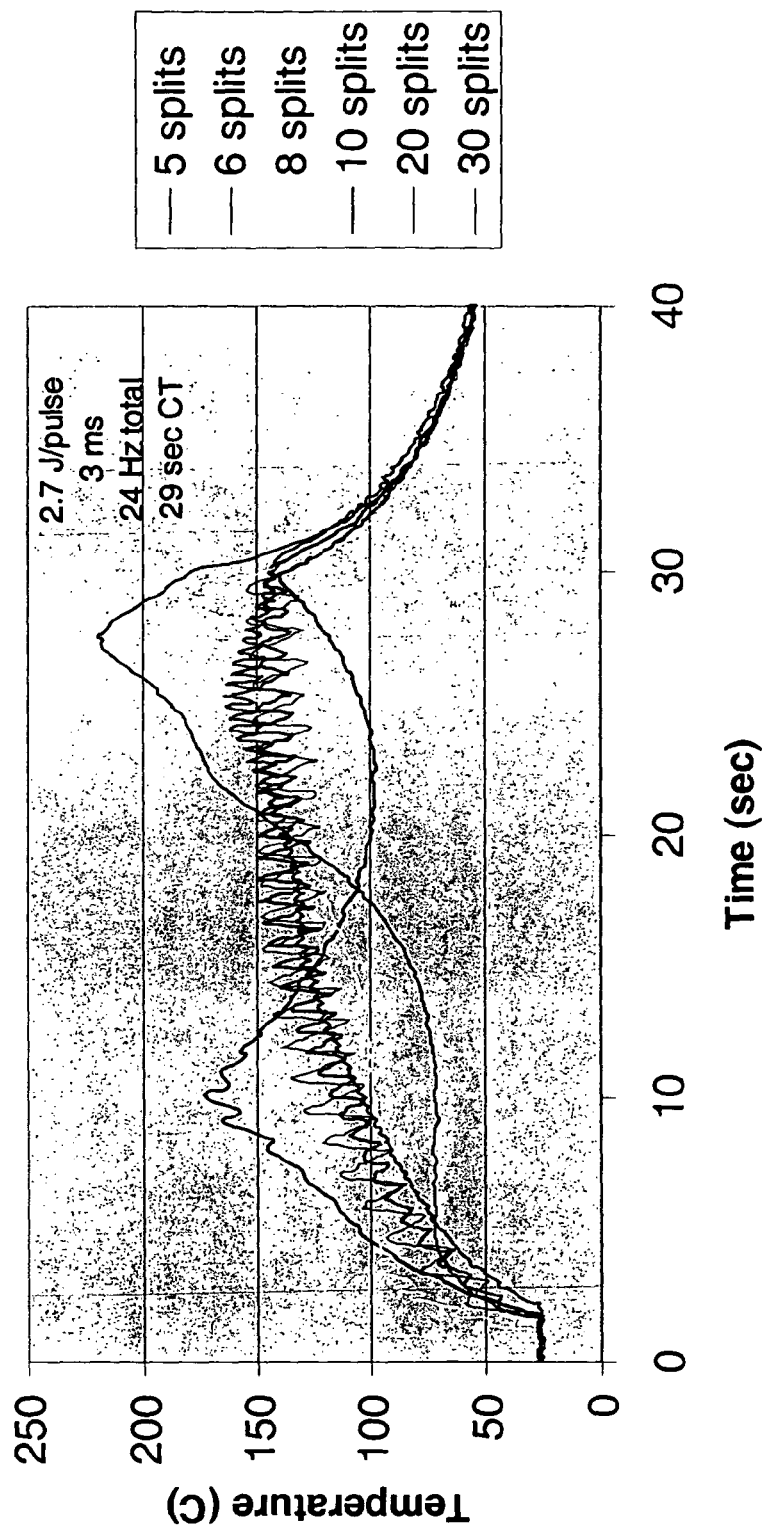

FIG. 14 and FIG. 15 depict plots of temperature versus time for performing a particular type of weld using several different embodiments of the invention. FIG. 14 shows that the cycle time for performing a given weld decreases by increasing the number of initial welding locations or "splits" along the weld path, while the peak temperature does not change dramatically. The laser pulse energy used was 2.7 Joules per pulse for three milliseconds with frequency per split maintained at 6 Hz.

Figure 16:
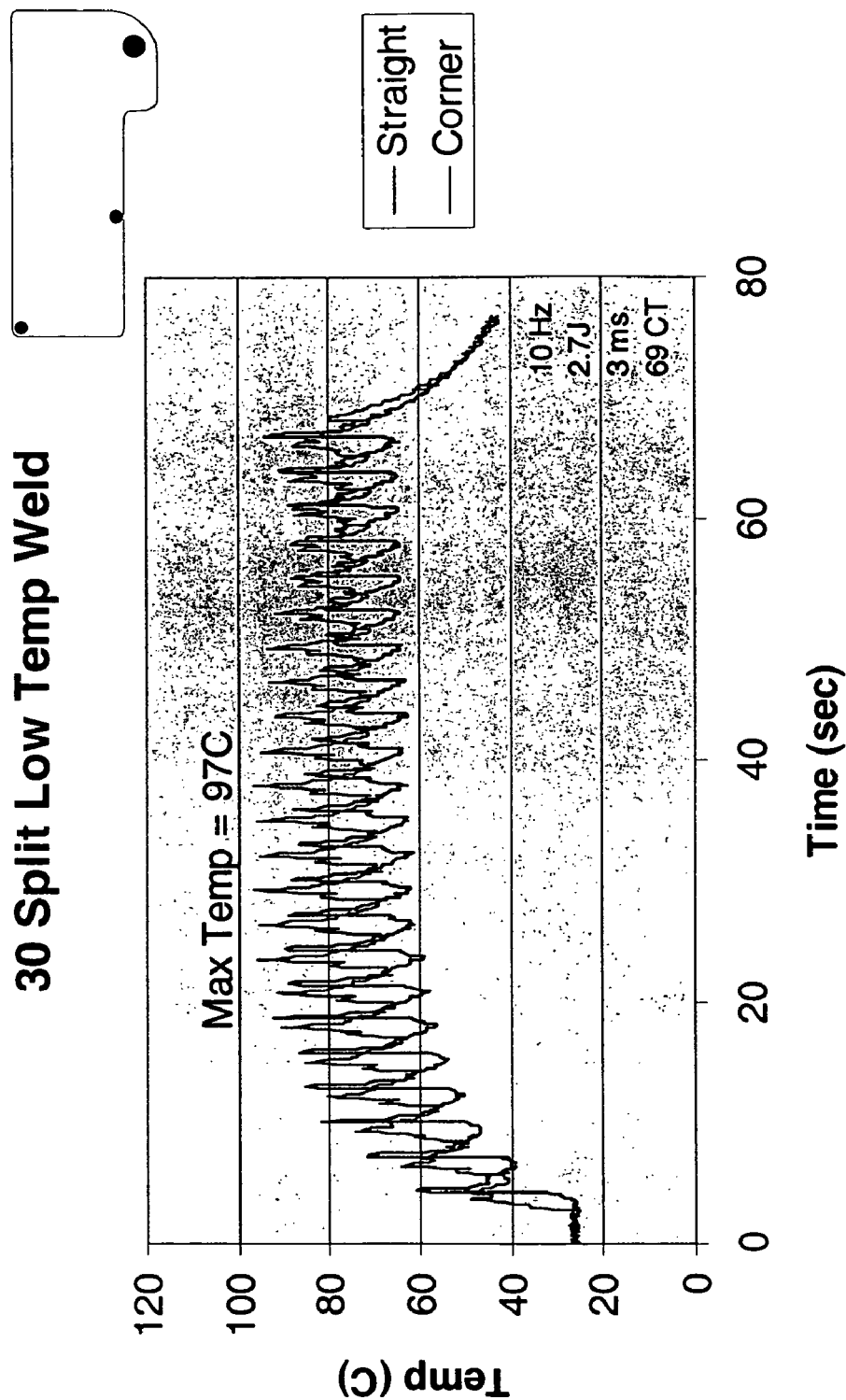
FIG. 16 illustrates an exemplary 30-split welding technique practiced on an arbitrary titanium workpiece that resembles a cover for an IMD component and the temperature of straight portions and corner portions of the workpiece recorded (and depicted).

In contrast as depicted in FIG. 15, the laser pulse energy was 2.7 Joules per pulse for three milliseconds while the cycle time was held constant by holding the total laser pulse frequency constant at 24 Hz. Hence, increasing the number of splits in FIG. 15 reduces the laser pulse frequency per split and results in lower peak temperatures. As demonstrated in FIG. 14 and FIG. 15, according to the invention the number of splits and the laser pulse frequency per split can be selected in accordance with embodiments of the invention to achieve faster cycle times and/or lower peak temperatures, as desired. With reference to FIG. 16, an exemplary 30 split welding technique was practiced on an arbitrary titanium workpiece that resembles a cover for an IMD component and the temperature of straight portions and corner portions of the workpiece recorded. The maximum recorded temperature was less than 100 degrees Celsius during approximately 69 seconds of active welding at 10 Hz with a 2.7 Joule laser source pulsed at 3 milliseconds.

Thus, select embodiments of the METHOD AND APPARATUS FOR LASER WELDING INCORPORATING GALVANOMETER DELIVERY are herein disclosed, depicted and described. One skilled in the art will appreciate that the present invention can be practiced with embodiments other than those disclosed. The disclosed embodiments are presented for purposes of illustration and not limitation, and the present invention is limited only by the claims that follow, including insubstantial changes therefrom.

We claim:

1. A method of laser welding to form a weld seam along a junction between metal coated polymer members suitable for use as part of an implantable medical device, comprising:
    defining a single weld path along the junction between the metal coated polymer members;
    locating a plurality of initial welding locations spaced along the single weld path;
    delivering a first sequence of pulses of laser beam energy, each pulse in the first sequence of pulses being directed to each of the plurality of initial welding locations to form a first sequence of a plurality of weld points of the metal coated polymer members at the plurality of initial welding locations; and
    delivering successive sequences of pulses of laser beam energy, the pulses in each successive sequence of pulses each being directed to each of the plurality of weld points located along the single weld path an incremental distance from each of the existing weld points to form successive sequences of weld points of the metal coated polymer members, the sequences continuing until the weld points form a generally continuous weld seam of the metal coated polymer members along the single weld path.

2. The laser welding method of claim 1, wherein the weld points formed by each sequence of pulses are spaced sufficiently along the weld path to distribute heat generated from the welding generally evenly along the weld path.

3. The laser welding method of claim 1, wherein the weld points formed in any one successive sequence are directly adjacent to the weld points formed in an immediately prior sequence to the any one successive sequence, and
    wherein each successive sequence of pulses forms the same number of weld points as formed in the first sequence of pulses.

4. The laser welding method of claim 1, wherein the successive sequences each form weld points progressively further from a respective one of the initial welding locations, and wherein the progression is in a weld direction, the weld direction being the same for each of the initial welding locations.

5. The laser welding method of claim 1, wherein successive sequences of pulses form weld points partially overlapping with existing weld points.

6. The laser welding method of claim 1, wherein the incremental distance is the same for each weld point in any one sequence of the successive sequences.

7. The laser welding method of claim 1, wherein the weld points formed are spot welds.

8. The laser welding method of claim 1, further comprising:
    providing a mirror for reflecting the pulses of laser beam energy;
    providing a galvanometer motor adapted to move the mirror to position the reflected laser beam along the weld path;
    moving the mirror with the galvanometer motor to position the reflected laser beam along the weld path to deliver the first sequence of pulses of laser beam energy; and
    moving the mirror with the galvanometer motor to position the reflected laser beam along the weld path to deliver the successive sequences of pulses of laser beam energy.

9. The method of laser welding of claim 8, further comprising a second mirror and a second galvanometer motor adapted to position the reflected laser beam in two dimensions along the weld path.

10. The method of laser welding of claim 8, further comprising a dynamic Z galvanometer adapted to provide a variable focal length laser beam, wherein the weld path is three-dimensional.

11. The method of laser welding of claim 8, wherein the members being welded are rotated about an axis.

12. The method of laser welding of claim 8, wherein the weld path is measured and stored in memory.

13. The method of laser welding of claim 12, wherein the number and location of initial welding locations along the weld path is automatically determined.

14. The method of laser welding of claim 8, wherein the members being welded form a hermetic seal along the weld path having greater than 25% overlap between adjacent weld points.

15. The method of laser welding of claim 14, wherein the amount of overlap between adjacent weld points is generally equal along the weld path, and wherein the incremental distance between the center of adjacent weld points is less than a radius of a weld point.

16. The method of laser welding of claim 8, wherein the members being welded form a housing for an implantable medical device (IMD).

17. The method of laser welding of claim 8, wherein a single pulsed laser source delivers laser energy to a plurality of weld paths for a plurality of members being welded located on a single fixture.

18. A method of laser welding to form a weld seam along a junction between metal coated polymer members suitable for use as part of an implantable medical device, comprising:
    defining a single weld path along the junction between the metal coated polymer members;

locating at least two initial welding locations spaced apart along the single weld path;

delivering a first sequence of pulses of laser beam energy, each pulse in the first sequence of pulses being directed to each of the at least two initial welding locations to form a first sequence of discreet weld points at the at least two initial welding locations;

delivering a second sequence of pulses of laser beam energy, each pulse in the second sequence directed to each of the at least two weld points located along the single weld path an incremental distance from each of the at least two of the initial welding locations to form a second sequence of weld points, each of the weld points of the second sequence forming a continuous weld with one of the weld points of the first sequence of weld points; and delivering a next sequence of pulses of laser beam energy, each pulse in the next sequence directed to each of the at least two weld points located along the single weld path to form a next sequence of weld points, each of the weld points of the next sequence forming a continuous weld with one of the weld points of the first sequence and one of the weld points of the second sequence; and repeating delivery of next sequences of pulses of laser beam energy, each pulse of the repeated sequences forming a continuous weld with a weld point of a previous sequence until the weld points of each sequence form a continuous weld seam of the members between the initial weld locations.

19. The method of claim 18 wherein each pulse in the second sequence is directed to a weld point located the incremental distance from one of the initial welding locations in a first direction along the weld path, and at least one pulse in the next sequence is directed to a weld point located the incremental distance from one of the initial welding locations in a second direction opposite the first direction along the weld path.

* * * * *